United States Patent
Yamaji et al.

(10) Patent No.: US 9,992,743 B2
(45) Date of Patent: Jun. 5, 2018

(54) WIRELESS DEVICE, GATEWAY APPARATUS, AND WIRELESS COMMUNICATION SYSTEM

(71) Applicant: YOKOGAWA ELECTRIC CORPORATION, Musashino-shi, Tokyo (JP)

(72) Inventors: Masato Yamaji, Tokyo (JP); Kenichi Takeda, Tokyo (JP); Masaki Shioya, Tokyo (JP); Naoyuki Fujimoto, Tokyo (JP); Minoru Midorikawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days. days.

(21) Appl. No.: 15/136,410

(22) Filed: Apr. 22, 2016

(65) Prior Publication Data

US 2016/0323825 A1 Nov. 3, 2016

(30) Foreign Application Priority Data

Apr. 28, 2015 (JP) .................. 2015-091887

(51) Int. Cl.
*H04W 52/02* (2009.01)
*H04W 88/16* (2009.01)
(Continued)

(52) U.S. Cl.
CPC ........ *H04W 52/0235* (2013.01); *G08C 17/02* (2013.01); *H04B 5/0037* (2013.01); *H04B 5/0056* (2013.01); *H04L 41/0813* (2013.01); *H04L 41/24* (2013.01); *H04W 4/80* (2018.02); *G08C 2200/00* (2013.01); *G08C 2201/12* (2013.01); *H04L 12/10* (2013.01); *H04L 12/12* (2013.01); *H04W 72/0446* (2013.01); *H04W 88/16* (2013.01); *Y02D 70/00* (2018.01);
(Continued)

(58) Field of Classification Search
CPC . H04W 52/0235; H04W 88/16; H04W 4/008; H04W 72/0446; H04L 41/24; H04L 41/0813; H04L 12/12; H04L 12/10; G08C 17/02; G08C 2200/00; G08C 2201/12; H04B 5/0037; H04B 5/0056; Y02B 60/50
See application file for complete search history.

(56) References Cited

U.S. PATENT DOCUMENTS

2004/0140360 A1* 7/2004 Deguchi ............ G06K 7/10346
235/451
2010/0134257 A1 6/2010 Puleston et al.
(Continued)

FOREIGN PATENT DOCUMENTS

GB 2514644 A 12/2014
JP 2006254077 A 9/2006
(Continued)

*Primary Examiner* — Andrew Wendell
(74) *Attorney, Agent, or Firm* — Sughrue Mion, PLLC

(57) ABSTRACT

A wireless device that performs an operation based on setting information includes a wireless communicator configured to perform wireless communication over a wireless network, a near field communicator comprising a memory storing the setting information and configured to perform transmission and reception of the setting information stored in the memory by near field communication, and a controller configured to control at least the wireless communicator.

19 Claims, 10 Drawing Sheets

(51) Int. Cl.
*H04L 12/24* (2006.01)
*G08C 17/02* (2006.01)
*H04B 5/00* (2006.01)
*H04W 72/04* (2009.01)
*H04L 12/10* (2006.01)
*H04L 12/12* (2006.01)

(52) U.S. Cl.
CPC ........ *Y02D 70/1222* (2018.01); *Y02D 70/144* (2018.01); *Y02D 70/162* (2018.01); *Y02D 70/166* (2018.01); *Y02D 70/42* (2018.01)

(56) References Cited

U.S. PATENT DOCUMENTS

| | | |
|---|---|---|
| 2010/0302009 A1 | 12/2010 | Hoeksel et al. |
| 2012/0155278 A1 | 6/2012 | Itou |
| 2012/0164944 A1 | 6/2012 | Yamaoka et al. |
| 2013/0063253 A1* | 3/2013 | Rashid ............. G06K 19/07769 340/10.5 |
| 2014/0066045 A1 | 3/2014 | Tanaka et al. |
| 2014/0173716 A1* | 6/2014 | Manipatruni ........... G06F 21/44 726/17 |
| 2014/0285033 A1* | 9/2014 | Jantunen ............... H04B 5/0031 307/149 |
| 2014/0340698 A1* | 11/2014 | Baba .................... H04B 5/0056 358/1.13 |
| 2015/0002872 A1 | 1/2015 | Naruse |
| 2015/0004905 A1* | 1/2015 | Mizuno ................ H04B 5/0031 455/41.1 |
| 2015/0171930 A1* | 6/2015 | Joehren ................ H04B 5/0037 455/41.1 |
| 2015/0173020 A1* | 6/2015 | Mikami ............ H04W 52/0235 370/311 |
| 2016/0127458 A1* | 5/2016 | Li ......................... H04L 61/106 709/204 |
| 2017/0019461 A1* | 1/2017 | Komatsuzaki ..... H04N 7/17318 |
| 2017/0078839 A1* | 3/2017 | Dong ................... H04W 36/08 |

FOREIGN PATENT DOCUMENTS

| | | |
|---|---|---|
| JP | 2007-074598 A | 3/2007 |
| JP | 2008-160856 A | 7/2008 |
| JP | 201529262 A | 2/2015 |
| WO | 2012004939 A1 | 1/2012 |
| WO | 2013121758 A1 | 8/2013 |

* cited by examiner

WIRELESS DEVICE, GATEWAY APPARATUS, AND WIRELESS COMMUNICATION SYSTEM

BACKGROUND OF THE INVENTION

Field of the Invention

The present invention relates to a wireless device, a gateway apparatus, and a wireless communication system.

Priority is claimed on Japanese Patent Application No. 2015-091887, filed on Apr. 28, 2015, the contents of which are incorporated herein by reference.

Description of Related Art

In recent years, a distributed control system (DCS) built in plants, factories, or the like has become a wireless system. That is, a distributed control system in which devices at a site (measures or operating devices) capable of wireless communication, called wireless field devices, and a control apparatus that performs control of the field device are connected over a wireless network has been built in plants or the like. A communication standard used for the wireless communication system that forms a basis of such a distributed control system includes, for example, an industrial wireless communication standard such as ISA100.11a or WirelessHART (registered trademark).

The wireless device such as the above wireless field device includes a connection port to which an external device (for example, a setting device) is connected, and various settings are performed by the external device connected to the connection port. For example, setting (provisioning) for causing the wireless device to participate in a wireless network, or various settings (for example, setting of a measurement range) regarding measurement when the wireless device is a measuring instrument are performed. The connection port included in the wireless device includes, for example, a serial port, a Universal Serial Bus (USB) port, and an infrared port.

In Japanese Unexamined Patent Application, First Publication No. 2007-74598 (hereinafter, referred to as Patent Document 1) and Japanese Unexamined Patent Application, First Publication No. 2008-160856 (hereinafter, referred to as Patent Document 2), a communication system that is not related to a wireless device installed in a plant, such as a wireless field device, but performs near field communication (NFC) is disclosed. Specifically, a technology capable of switching between NFC and BT communication (wireless short-range communication such as Bluetooth (registered trademark)) is disclosed in Patent Documents 1 and 2.

In order to perform various settings of the wireless device using the above-described external device, it is necessary for an operator carrying the external device to visit an installation location of the wireless device and connect the external device to the wireless device. When the wireless device is installed at a location in which a working environment is poor, such as a high place, it is necessary for the operator to perform work at the location in which the working environment is poor. Accordingly, workability and work efficiency become degraded.

Further, if it is necessary for the external device to be connected to the wireless device in a wired manner, complicated work for inserting a connection cable into the connection port of the wireless device is required. Thus, work efficiency becomes degraded. In addition, if the wireless device is installed outdoors, the connection port is likely to be exposed to wind and rain when the connection cable is connected to the connection port. Thus, a countermeasure for protection against dust or water is required.

Further, when a failure occurs in the wireless device, it is necessary for the wireless device in which the failure occurs to be replaced with a new wireless device, and for setting information of the wireless device in which the failure occurs to be handed over to the new wireless device. However, in a wireless device of the related art, even if a failure occurs in some of circuits (for example, a power supply circuit or a central processing unit (CPU)), it is often difficult to read the setting information, and replacement work is hindered. In a wireless device using a battery as a power supply, when there is no remaining charge in the battery, the setting information cannot be read.

In the wireless device using a battery as a power supply, for example, it is desirable for the power supply to be cut off by a hardware switch so as to prevent consumption of the battery when the wireless device is not used (for example, before installation at a site or during inspection of a facility). However, an operation of such a hardware switch may be difficult in an environment in which protection against water, dust, and explosion is required. Therefore, if a mechanism in which the wireless device is caused to enter a sleep state (low power consumption state) when the wireless device is not used, and the wireless device is awakened when use of the wireless device is initiated is provided, it is considered that problems associated with use of the hardware switch are not caused. However, since it is necessary to operate a circuit that detects a wake-up signal from the outside at any time during the sleep state, battery consumption increases.

SUMMARY OF THE INVENTION

One aspect of the present invention provides a wireless device, a gateway apparatus, and a wireless communication system capable of improving workability and work efficiency in various work performed at a site.

A wireless device according to one aspect of the present invention may performs an operation based on setting information. The wireless device may include a wireless communicator configured to perform wireless communication over a wireless network, a near field communicator including a memory storing the setting information and configured to perform transmission and reception of the setting information stored in the memory by near field communication, and a controller configured to control at least the wireless communicator.

In the above-described wireless device, the near field communicator may be configured to operate using power supplied from an outside of the wireless device by the near field communication.

In the above-described wireless device, the memory may be configured to operate using power supplied from an outside of the wireless device by the near field communication.

In the above-described wireless device, the near field communicator may be configured to cause the controller to transition to a sleep state or release the sleep state of the controller based on information received by the near field communication.

The above-described wireless device may further include a reader-writer configured to perform at least one of reading of information from an outside of the wireless device and writing of information to the outside by the near field communication.

In the above-described wireless device, the reader-writer may be configured to supply power to the outside by the near field communication.

In the above-described wireless device, the controller may be configured to use a table in which predetermined ID information and a control content are associated with each other and to perform a control associated with the ID information included in the information read by the reader-writer.

The above-described wireless device may further include a first storage storing ID information included in the information read by the reader-writer and date and time information indicating a date and time at which the reading of the ID information has been performed.

In the above-described wireless device, the near field communicator may be configured to input a sleep release signal to the controller after supplying a part of power supplied from an outside of the wireless device by the near field communication.

The above-described wireless device may further include a power supply configured to supply power to the wireless communicator, the near field communicator, the controller, and the reader-writer.

In the above-described wireless device, the reader-writer may be configured to write the setting information stored in the memory to another wireless device.

The above-described wireless device may further include an actuator configured to perform measurement of a state amount or an operation. The controller may be configured to setting of the actuator based on the setting information stored in the memory.

The above-described wireless device may further include a transfer controller configured to transfer data addressed to the wireless device and transmitted over the wireless network to a preset transfer destination.

The above-described wireless device may further include a second storage storing data addressed to the wireless device. The near field communicator may be configured to perform transmission of the data stored in the second storage.

A gateway apparatus according to one aspect of the present invention may include a first communicator connected to a first network, a second communicator connected to a second network, and a near field communicator including a memory storing setting information to be set in a wireless device and configured to perform transmission and reception of the setting information stored in the memory by near field communication.

The above-described gateway apparatus may further include a reader-writer configured to perform at least one of reading of information from an outside of the gateway apparatus and writing of information to the outside by the near field communication.

In the above-described gateway apparatus, the near field communicator may be configured to operate using power supplied from an outside of the gateway apparatus by the near field communication.

In the above-described gateway apparatus, the memory may be configured to operate using power supplied from an outside of the gateway apparatus by the near field communication.

A wireless communication system according to one aspect of the present invention is capable of performing wireless communication over a wireless network. The wireless communication system may include the above-described wireless device communicatively connected to the wireless network.

The above-described wireless communication system may further include a wireless router configured to communicatively connect the wireless network to a first network, a monitoring and control apparatus communicatively connected to a second network and configured to monitor and control the wireless device, and a gateway apparatus configured to communicatively connect the first network to the second network. The gateway apparatus may include a first communicator connected to the first network, a second communicator connected to the second network, and a near field communicator including a memory storing the setting information to be set in the wireless device and configured to perform transmission and reception of the setting information stored in the memory by the near field communication.

According to one aspect of the present invention, it is possible to improve workability and work efficiency in various work performed at a site since the memory that stores the setting information is provided and transmission and reception of the setting information stored in the memory are performed by the near field communication.

DETAILED DESCRIPTION OF THE INVENTION

Hereinafter, a wireless device, a gateway apparatus, and a wireless communication system according to some embodiments of the present invention will be described in detail with reference to the drawings.

[First Embodiment]
<Wireless Communication System>

Figure 1:
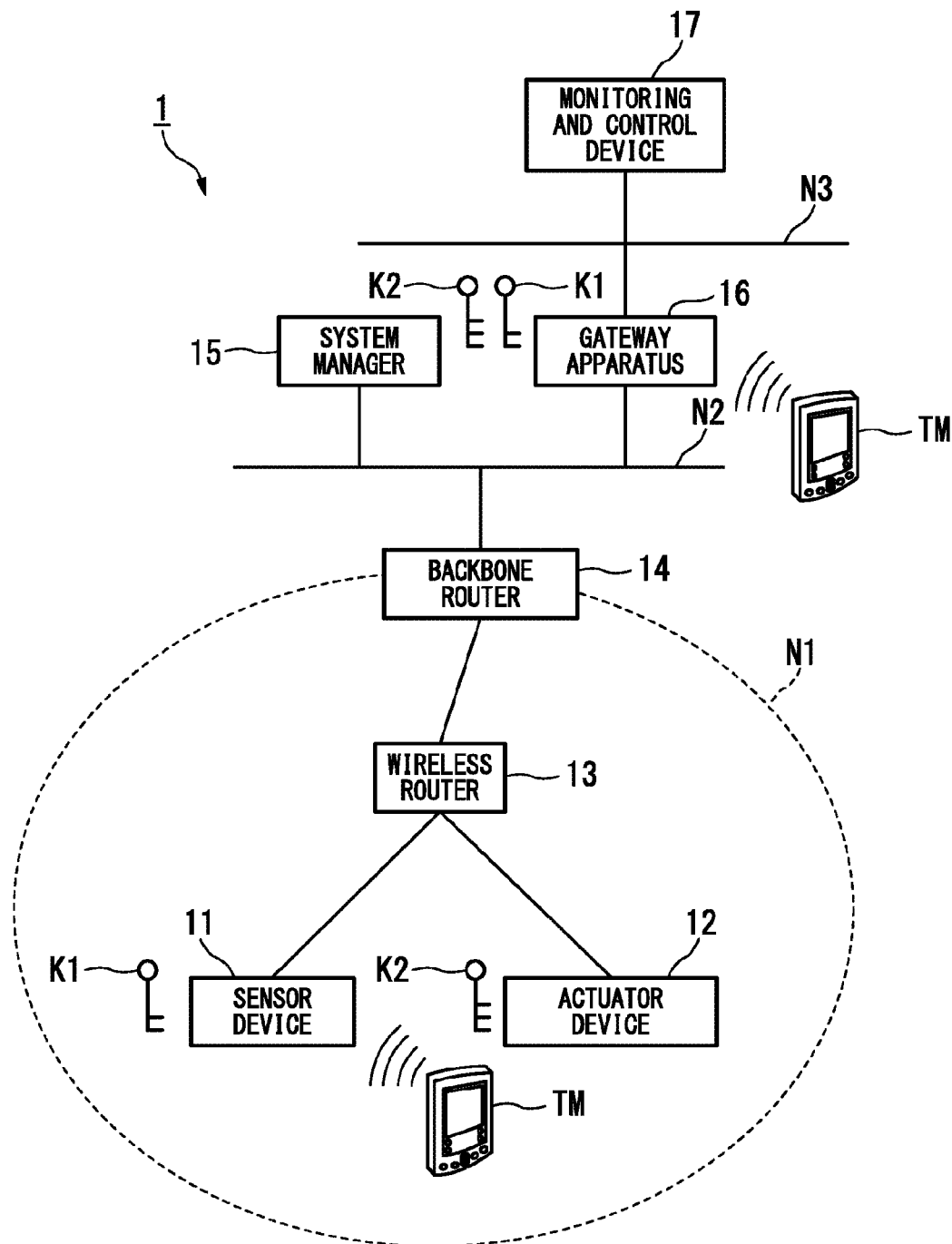
FIG. 1 is a block diagram showing an entire configuration of a wireless communication system according to a first embodiment of the present invention.

FIG. 1 is a block diagram showing an entire configuration of a wireless communication system according to a first embodiment of the present invention. As shown in FIG. 1, a wireless communication system 1 according to the present embodiment includes, for example, a sensor device 11 (wireless device), an actuator device 12 (wireless device), a wireless router 13 (wireless device), a backbone router 14 (wireless router), a system manager 15, a gateway apparatus 16 (gateway apparatus), and a monitoring and control apparatus 17. The wireless communication system 1 having such a configuration is capable of wireless communication using a time division multiple access (TDMA) scheme over a wireless network N1.

This wireless communication system 1 is built in, for example, a plant, a factory, or the like (hereinafter collectively referred to simply as a "plant"). The above plant includes a plant that manages and controls a wellhead such as a gas field or an oil field and its surroundings, a plant that manages and controls power generation, such as hydropower generation, thermal power generation, and nuclear power generation, a plant that manages and controls energy harvesting such as solar power generation or wind power generation, a plant that manages and controls water and sewage or a dam, or the like, in addition to an industrial plant such as a chemical plant.

The above wireless network N1 is a wireless network that is formed by wireless devices (the sensor device 11, the actuator device 12, and the wireless router 13) installed at a site of the plant, and a backbone router 14, and is managed by the system manager 15. In FIG. 1, although the illustration is simplified, the number of sensor devices 11, actuator devices 12, wireless routers 13, and backbone routers 14, which form the wireless network N1, is optional.

Further, in addition to the above wireless network N1, a backbone network N2 (first network) and a control network N3 (second network) are provided in the plant in which the wireless communication system 1 is built. The backbone network N2 is a wired network that is a backbone of the wireless communication system 1, and to which the backbone router 14, the system manager 15, and the gateway apparatus 16 are connected. The control network N3 is a wired network located at a higher level of the backbone network N2, and to which the gateway apparatus 16 and the monitoring and control apparatus 17 are connected. The backbone network N2 and the control network N3 may be realized as a wireless communication network.

The sensor device 11 and the actuator device 12 are field devices (wireless field devices) that perform a measurement, an operation, or the like necessary for process control under the control of the monitoring and control apparatus 17 installed at a site of the plant. For example, the sensor device 11 is a flow meter or a temperature sensor, and the actuator device 12 is an open-close valve or a motor. The sensor device 11 and the actuator device 12 perform a power-saving operation (for example, intermittent operation) using a battery as a power supply, and is capable of wireless communication using a TDMA scheme conforming to the wireless communication standard ISA100.11a.

Different encryption keys are distributed to the sensor device 11 and the actuator device 12 in order to ensure security. Specifically, an encryption key K1 is distributed to the sensor device 11, and an encryption key K2 is distributed to the actuator device 12. The encryption key K1 is used to perform encrypted communication between the sensor device 11 and the gateway apparatus 16. The encryption key K2 is used to perform encrypted communication between the actuator device 12 and the gateway apparatus 16. The encryption keys K1 and K2 are distributed by the system manager 15 when the sensor device 11 and the actuator device 12 participate in the wireless network N1.

Further, the sensor device 11 and the actuator device 12 are capable of near field communication (NFC), in addition to the wireless communication described above. The NFC refers to, for example, communication (non-contact communication) that can be performed when a distance between devices communicating with each other is tens of cm or less, and also includes communication that is performed in a state in which housings of devices communicating with each other come into contact with each other. In this NFC, supply of power from one device performing communication to the other device can be performed in a non-contact manner. The sensor device 11 and the actuator device 12 capable of the NFC can communicate with an information terminal apparatus TM (external device) such as a smartphone, a tablet computer, or a notebook computer that is capable of the NFC. The sensor device 11, the actuator device 12, and the information terminal apparatus TM will be described below in detail.

The wireless router 13 is capable of wireless communication conforming to the above wireless communication standard ISA100.11a. The wireless router 13 is communicatively connected to the wireless network N1 and performs relay of data over the wireless network N1. For example, the wireless router 13 transfers data transmitted from the sensor device 11 to the gateway apparatus 16, and transfers, to the actuator device 12, data that is output from the monitoring and control apparatus 17 and passes through the gateway apparatus 16 and the backbone router 14 in this order. The wireless router 13 may be configured to be capable of the NFC, similar to the sensor device 11 and the actuator device 12.

The backbone router 14 connects the wireless network N1 to the backbone network N2, and performs relay of data which is transmitted or received between the wireless network N1 and the backbone network N2. This backbone router 14 also performs the wireless communication conforming to the wireless communication standard ISA100.11a. The backbone router 14 may also be configured to be capable of the NFC, similar to the sensor device 11 and the actuator device 12.

The system manager 15 performs control of the wireless communication that is performed over the wireless network N1. Specifically, the system manager 15 performs control for allocation of communication resources (a time slot and a communication channel) to the sensor device 11 the actuator device 12, the wireless router 13, the backbone router 14, and the gateway apparatus 16 to realize the wireless communication using TDMA over the wireless network N1. Further, the system manager 15 performs a process of determining whether the sensor device 11, the actuator device 12, the wireless router 13, and the backbone router 14 are caused to participate in the wireless network N1 (participation process). The system manager 15 performs distribution of encryption keys (for example, the encryption keys K1 and K2 described above) when causing the sensor device 11, the actuator device 12, the wireless router 13, and the backbone router 14 to participate in the wireless network N1.

The gateway apparatus 16 connects the backbone network N2 to the control network N3, and performs relay of various data that is transmitted and received between the sensor device 11, the actuator device 12, or the like and the monitoring and control apparatus 17. By providing this gateway apparatus 16, it is possible to connect the backbone network N2 and the control network N3 to each other while maintaining security. The encryption keys K1 and K2 described above are distributed to the gateway apparatus 16 in order to ensure the security. The gateway apparatus 16 is configured to be capable of the NFC, similar to the sensor device 11, the actuator device 12, or the like, and is capable of communication with the information terminal apparatus TM (external device). The gateway apparatus 16 will be described below in detail.

The monitoring and control apparatus 17 performs monitoring and management of the sensor device 11, the actuator device 12, and the like. Specifically, the monitoring and control apparatus 17 performs monitoring of the sensor device 11 by collecting various data transmitted from the sensor device 11 via the gateway apparatus 16. Further, the monitoring and control apparatus 17 obtains a control amount of the actuator device 12 based on the collected various data, and transmits control data indicating the control amount at regular time intervals via the gateway apparatus 16 to control the actuator device 12.

<Wireless Device>

Figure 2:
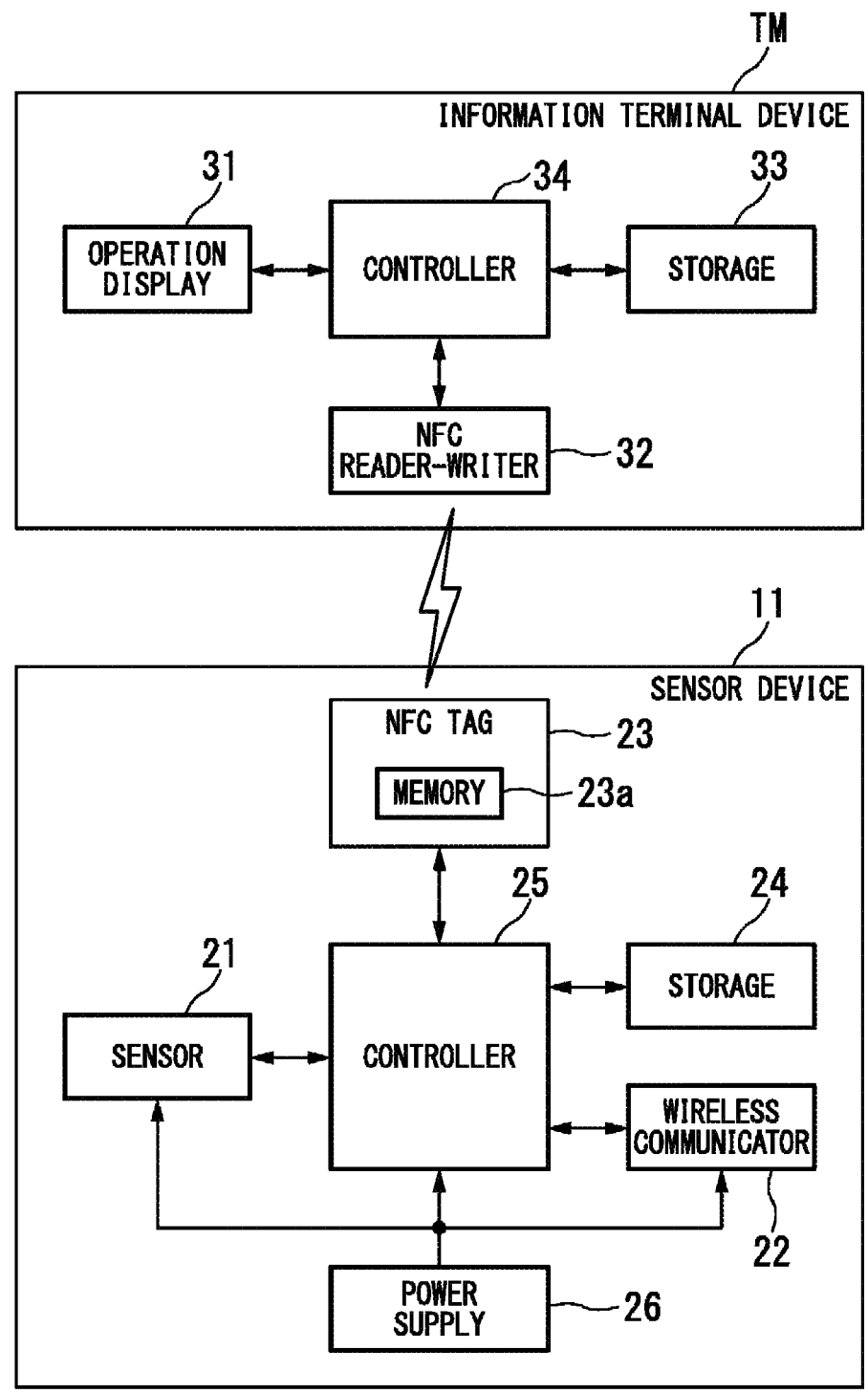
FIG. 2 is a block diagram showing a main configuration of a sensor device as a wireless device according to the first embodiment of the present invention.

FIG. 2 is a block diagram showing a main configuration of the sensor device as a wireless device according to the first embodiment of the present invention. In FIG. 2, the information terminal apparatus TM is also shown, in addition to the sensor device 11. As shown in FIG. 2, the sensor device 11 includes a sensor 21 (actuator), a wireless communicator 22, an NFC tag 23 (near field communicator), a storage 24 (first storage), a controller 25, and a power supply 26. The sensor device 11 performs an operation based on setting information stored in the NFC tag 23.

The sensor 21 is operated by power supplied from the power supply 26, and performs measurement of a measurement target (for example, flow rate or temperature) under the control of the controller 25. The wireless communicator 22 is operated by the power supplied from the power supply 26, similar to the sensor 21, and performs wireless communication over the wireless network N1 under the control of the controller 25. For example, the wireless communicator 22 transmits a measurement result (for example, a result of the measurement of the flow rate or the temperature) of the sensor 21 to the monitoring and control apparatus 17 over the wireless network N1. The wireless communicator 22 performs wireless communication conforming to the wireless communication standard ISA100.11a described above.

The NFC tag 23 includes an antenna (not shown) and a memory 23a, is operated by power supplied from the outside (for example, the information terminal apparatus TM), and performs NFC with the outside. The memory 23a provided in the NFC tag 23 is, for example, a nonvolatile memory which is mounted as an IC chip, and is operated by the power supplied from the outside. Various setting information set in the sensor device 11 is stored in this memory 23a. The setting information stored in the memory 23a is, for example, information (provisioning information) necessary for participating in the wireless network N1, or information for setting a measurement range of the sensor 21. The memory 23a may be provided outside the NFC tag 23.

Specifically, the NFC tag 23 is operated by the power supplied from the information terminal apparatus TM arranged in close proximity (arranged at a distance of approximately tens of cm or less). The NFC tag 23 reads the data stored in the memory 23a and transmits the data to the information terminal apparatus TM when the NFC tag 23 receives a data read request from the information terminal apparatus TM arranged in close proximity. Further, the NFC tag 23 writes data received (data to be written) from the information terminal apparatus TM to the memory 23a when the NFC tag 23 receives a data write request from the information terminal apparatus TM arranged in close proximity.

Further, the NFC tag 23 causes the controller 25 to transition to a sleep state (low power consumption state) or releases the sleep state of the controller 25 based on data received by the NFC. Specifically, the NFC tag 23 inputs a sleep signal or a sleep release signal to the controller 25 based on the received data to cause the controller 25 to transition to the sleep state or release the sleep state of the controller 25. When the sleep state of the controller 25 is to be released, the NFC tag 23 supplies a part of the power supplied from the information terminal apparatus TM to the controller 25, and then, inputs the above sleep release signal to the controller 25. The controller 25 may cause at least one of the sensor 21, the wireless communicator 22, and the storage 24 to enter the sleep state with the transition to the sleep state, and may cause the sleep state of at least one of the sensor 21, the wireless communicator 22, and the storage 24 to be released with the sleep release.

The storage 24 includes, for example, a non-volatile memory such as a flash read only memory (ROM) or an electrically erasable and programmable ROM (EEPROM), and stores various information. For example, the storage 24 temporarily stores the measurement result of the sensor 21. When the memory 23a of the NFC tag 23 is provided outside the NFC tag 23, the storage 24 may also be used as the memory 23a.

The controller 25 is operated by the power supplied from the power supply 26, and collectively controls the operation of the sensor device 11. For example, the controller 25 controls the sensor 21 so that a measurement of the measurement target is performed, and controls the wireless communicator 22 so that a measurement result of the sensor 21 is transmitted. Further, the controller 25 performs, for example, various settings using the setting information stored in the memory 23a of the NFC tag 23. For example, the controller 25 performs setting for causing the sensor device 11 to participate in the wireless network N1, setting of the measurement range of the sensor 21, or the like. Further, the controller 25 controls the sensor 21 and the wireless communicator 22 so that a power saving operation (for example, intermittent operation) is performed. Further, the controller 25 transitions to the sleep state, for example, based on a control signal from the NFC tag 23.

The power supply 26 includes a power supply (not shown) that performs supply of power, and a power supply circuit (not shown) that converts the power from the power supply into a power suitable for a power used for the sensor 21, the wireless communicator 22, the storage 24, and the controller 25. The power supply 26 supplies the power to each unit of the sensor device 11 under the control of the controller 25. A battery (for example, a primary battery or a secondary battery in which self-discharge is very small, such as a lithium thionyl chloride battery), a fuel cell, a capacitor, a power generation circuit that performs energy harvesting (so-called energy harvesting such as a solar cell), or the like may be used as the above power supply.

The actuator device 12 has substantially the same configuration as that of the sensor device 11 except for the sensor 21 shown in FIG. 2. That is, the actuator device 12 has a configuration in which an actuator that performs various operations is provided in place of the sensor 21 included in the sensor device 11 shown in FIG. 2. The actuator device 12 having such a configuration is capable of NFC, in addition to wireless communication over the wireless network N1, similar to the sensor device 11. The actuator device 12 may include the sensor 21 that measures a state amount of surroundings (for example, in the case of an open-close valve, a pressure of air supplied to the valve).

The information terminal apparatus TM includes an operation display 31, an NFC reader-writer 32, a storage 33, and a controller 34, as shown in FIG. 2. The operation display 31 includes, for example, a touch panel type liquid crystal display device having both a display function and an operation function, and displays various information output from the controller 34. When an operation with respect to a display surface of the liquid crystal display device is performed, the operation display 31 inputs an operation signal according to the operation to the controller 34. The operation display 31 may have a configuration in which the display function and the operation function are physically separated, for example, like a liquid crystal display device and a keyboard.

The NFC reader-writer 32 includes an antenna (not shown), and performs supply of power to an external device (for example, the NFC tag 23 of the sensor device 11 arranged in close proximity) in a non-contact manner. Further, the NFC reader-writer 32 performs NFC with the external device and performs reading of data from the external device or writing of data to the external device.

The storage 33 includes, for example, a non-volatile memory such as a flash ROM or an EEPROM, similar to the storage 24 of the sensor device 11, and stores various information. For example, the storage 33 stores setting information to be set in the sensor device 11.

The controller 34 performs control of the operation display 31 (display control and input control), and controls the NFC reader-writer 32 to control reading data from an external device or writing of data to the external device.

<Gateway Apparatus>

Figure 3:
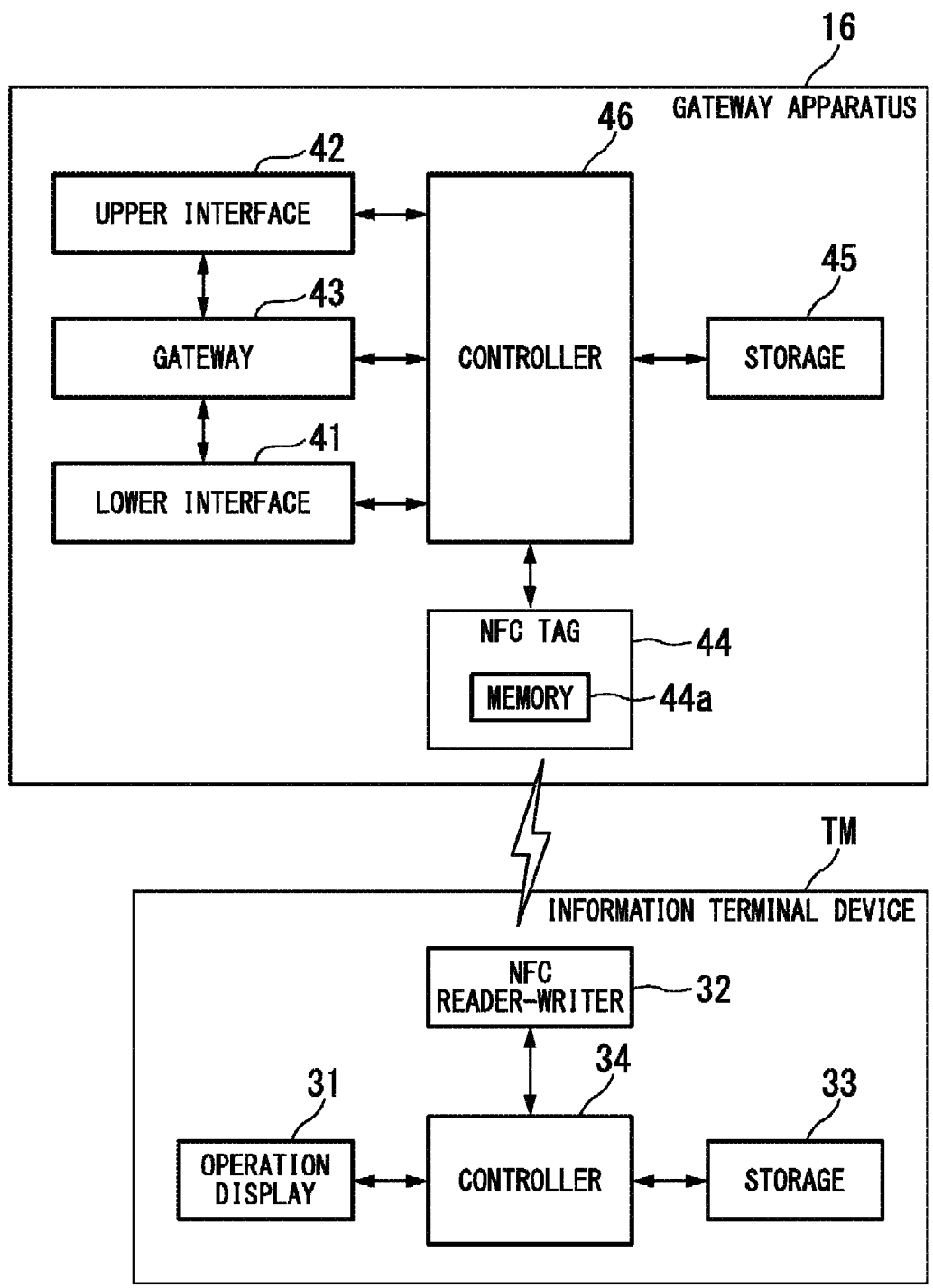
FIG. 3 is a block diagram showing a main configuration of a gateway apparatus according to the first embodiment of the present invention.

FIG. 3 is a block diagram showing a main configuration of a gateway apparatus according to the first embodiment of the present invention. In FIG. 3, the information terminal apparatus TM is shown in addition to the gateway apparatus 16, similarly to FIG. 2. As shown in FIG. 3, the gateway apparatus 16 includes a lower interface 41 (first communicator), an upper interface 42 (second communicator), a gateway 43, an NFC tag 44, a storage 45, and a controller 46.

The lower interface 41 is connected to the backbone network N2 and performs communication over the backbone network N2 under the control of the controller 46. The upper interface 42 is connected to the control network N3 and performs communication over the control network N3 under the control of the controller 46. The gateway 43 performs a process of transferring data, which is transmitted to the gateway apparatus 16. Further, the gateway 43 also performs decrypting the received data and encryption of data to be transferred using, for example, the encryption keys K1 and K2 shown in FIG. 1.

The NFC tag 44 is the same as the NFC tag 23 provided in the sensor device 11, and includes an antenna (not shown) and a memory 44a. The NFC tag 44 is operated by power supplied from the outside (for example, the information terminal apparatus TM), and performs NFC with the outside. The storage 45 includes, for example, a non-volatile memory such as a flash ROM or an EEPROM, and stores various information. For example, the storage 45 stores data (sensing information) or log information received from the sensor device 11. When the memory 44a of the NFC tag 44 is provided outside, the storage 45 may also be used as the memory 44a. The controller 46 collectively controls the operation of the gateway apparatus 16.

<Operation of Sensor Device>

Next, an operation when setting work for the sensor device 11 is performed using the information terminal apparatus TM will be described. Hereinafter, first to fifth operations shown below will be described in order.

First operation: an operation when the setting information stored in the sensor device 11 is updated Second operation: an operation when previously prepared setting information is set in the sensor device 11

Third Operation: an operation when necessary setting information is automatically generated and set in the sensor device 11

Fourth Operation: an operation when different setting information is set in each sensor device 11

Fifth operation: an operation when the sensor device 11 is replaced with a new sensor device Any of the first to fifth operations described above to be performed is determined by, for example, the setting of the information terminal apparatus TM. When setting work for the actuator device 12 is performed, the same operation as in the case in which the setting operation for the sensor device 11 is performed is performed.

((First operation))

Figure 4:
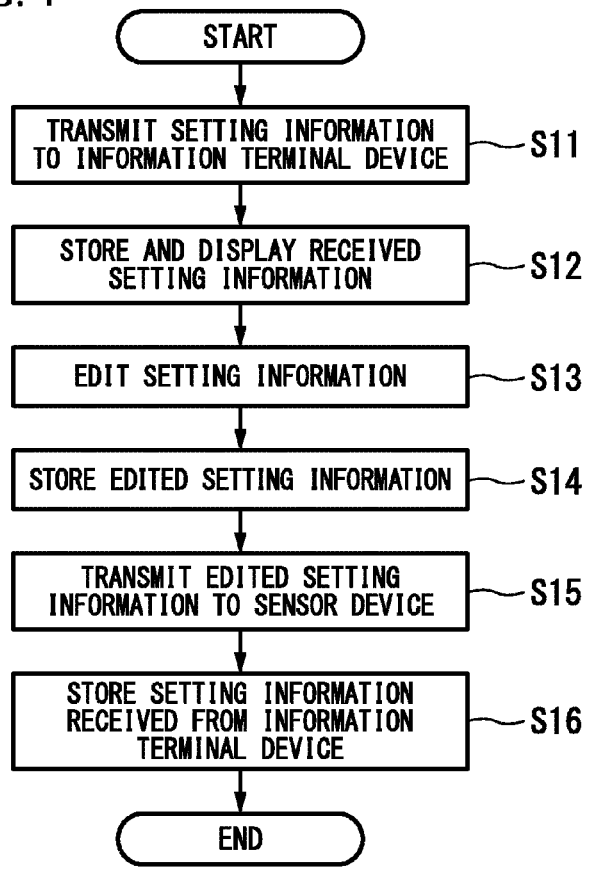
FIG. 4 is a flowchart showing an operation when setting information is updated in the first embodiment of the present invention.

FIG. 4 is a flowchart showing an operation when setting information is updated in the first embodiment of the present invention. The flowchart shown in FIG. 4 is initiated by an operator causing the information terminal apparatus TM to approach the sensor device 11 up to an NFC available distance (hereinafter referred to as "touch", but it should be noted that it is not necessarily required to cause the information terminal apparatus TM to come into contact with the sensor device 11).

When the operator causes the information terminal apparatus TM to touch the sensor device 11, supply of power is initiated from the NFC reader-writer 32 of the information terminal apparatus TM to the NFC tag 23 of the sensor device 11. Also, a data read request is transmitted from the NFC reader-writer 32 of the information terminal apparatus TM to the NFC tag 23 of the sensor device 11. When this read request is received by the NFC tag 23 of the sensor device 11, the setting information stored in the memory 23a is read and transmitted to the information terminal apparatus TM (step S11).

When the setting information transmitted from the NFC tag 23 of the sensor device 11 is received by the NFC reader-writer 32 of the information terminal apparatus TM, a process of storing the received setting information in the storage 33 and displaying the setting information on the operation display 31 is performed by the controller 34 (step S12). When the setting information displayed on the operation display 31 is referenced by the operator, a process of editing the setting information according to an instruction of the operator is performed (step S13). The editing of the setting information is performed by the operator operating the operation display 31 of the information terminal apparatus TM. When the editing by the operator ends, the edited setting information is stored in the storage 33 of the information terminal apparatus TM (step S14).

When the above work ends and the operator causes the information terminal apparatus TM to touch the sensor device 11, supply of power is initiated from the NFC reader-writer 32 of the information terminal apparatus TM to the NFC tag 23 of the sensor device 11. Also, a data write request and data to be written (edited setting information) are transmitted from the NFC reader-writer 32 of the information terminal apparatus TM to the NFC tag 23 of the sensor device 11 (step S15). When this write request is received by the NFC tag 23 of the sensor device 11, the data to be written (edited setting information) is stored in the memory 23*a* of the NFC tag 23 (step S16), and the processes in the flowchart are finished.

Thus, when the setting information stored in the sensor device 11 is updated, the operator first causes the information terminal apparatus TM to touch the sensor device 11 such that the setting information of the sensor device 11 is read to the information terminal apparatus TM. Then, the operator operates the information terminal apparatus TM to edit the read setting information. Finally, the operator causes the information terminal apparatus TM to touch the sensor device 11 such that the edited setting information is written to the sensor device 11. By performing this work, the setting information of the sensor device 11 is updated.

((Second Operation))

Figure 5:
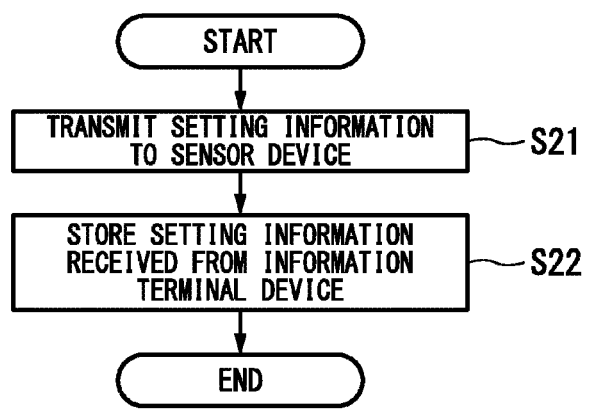
FIG. 5 is a flowchart showing an operation when previously prepared setting information is set in the first embodiment of the present invention.

FIG. 5 is a flowchart showing an operation when previously prepared setting information is set in the first embodiment of the present invention. The flowchart shown in FIG. 5 is initiated by the operator causing the information terminal apparatus TM to touch the sensor device 11. When the operator causes the information terminal apparatus TM to touch the sensor device 11, supply of power is initiated from the NFC reader-writer 32 of the information terminal apparatus TM to the NFC tag 23 of the sensor device 11.

Also, a data write request and data to be written (previously prepared setting information) are transmitted from the NFC reader-writer 32 of the information terminal apparatus TM to the NFC tag 23 of the sensor device 11 (step S21). When this write request is received by the NFC tag 23 of the sensor device 11, the data to be written (previously prepared setting information) is stored in the memory 23*a* of the NFC tag 23 (step S22), and the processes in the flowchart are finished.

Thus, when the previously prepared setting information is set in the sensor device 11, work in which the operator causes the information terminal apparatus TM to touch the sensor device 11 once is performed. Such work is performed, for example, when predetermined setting information is set in the sensor device 11 which is in a factory shipment state in which no setting has been performed in the past (initial value). When it is necessary to confirm whether the setting information has already been set in the sensor device 11, reading of the setting information from the sensor device 11 may be performed, and then, writing of the settings information to the sensor device 11 may be performed, as in the first operation.

((Third Operation))

Figure 6:
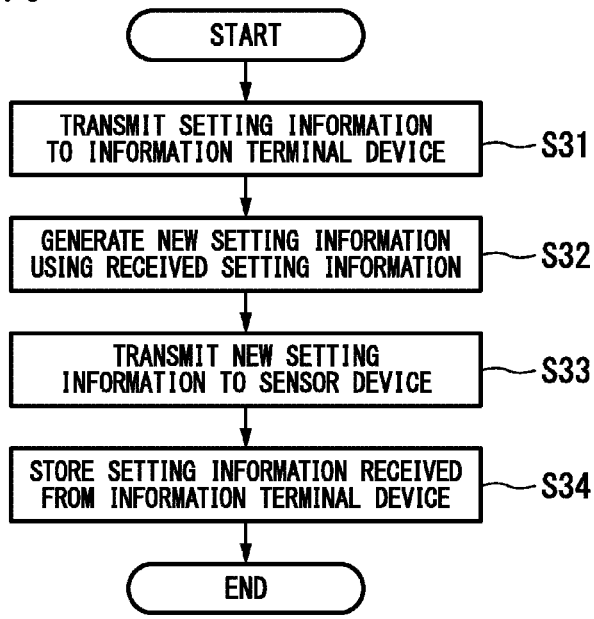
FIG. 6 is a flowchart showing an operation when necessary setting information is automatically generated and set in the first embodiment of the present invention.

FIG. 6 is a flowchart showing an operation when necessary setting information is automatically generated and set in the first embodiment of the present invention. The flowchart shown in FIG. 6 is also initiated by the operator causing the information terminal apparatus TM to touch the sensor device 11. When the operator causes the information terminal apparatus TM to touch the sensor device 11, supply of power is initiated from the NFC reader-writer 32 of the information terminal apparatus TM to the NFC tag 23 of the sensor device 11. Also, a data read request is transmitted from the NFC reader-writer 32 of the information terminal apparatus TM to the NFC tag 23 of the sensor device 11. When this read request is received by the NFC tag 23 of the sensor device 11, the setting information stored in the memory 23*a* is read and transmitted to the information terminal apparatus TM (step S31).

When the setting information transmitted from the NFC tag 23 of the sensor device 11 is received by the NFC reader-writer 32 of the information terminal apparatus TM, a process of automatically generating new setting information based on such setting information is performed by the information terminal apparatus TM (step S32). When the new setting information is generated, a data write request and data to be written (new setting information) are transmitted from the NFC reader-writer 32 of the information terminal apparatus TM to the NFC tag 23 of the sensor device 11 (step S33). When the write request is received by the NFC tag 23 of the sensor device 11, the data to be written (new setting information) is stored in the memory 23*a* of the NFC tag 23 (step S34), and the processes in the flowchart are finished.

Thus, when the necessary setting information is automatically generated and set in the sensor device 11, work in which the operator causes the information terminal apparatus TM to touch the sensor device 11 once is performed. Such work is performed, for example, when the information terminal apparatus TM automatically generates a security key for each sensor device 11 and sets the security key in each sensor device 11. In such work, it is not necessary for the operator to confirm the setting information read from the sensor device 11, unlike the first operation. Therefore, the operation display 31 of the information terminal apparatus TM may be omitted.

((Fourth Operation))

Figure 7:
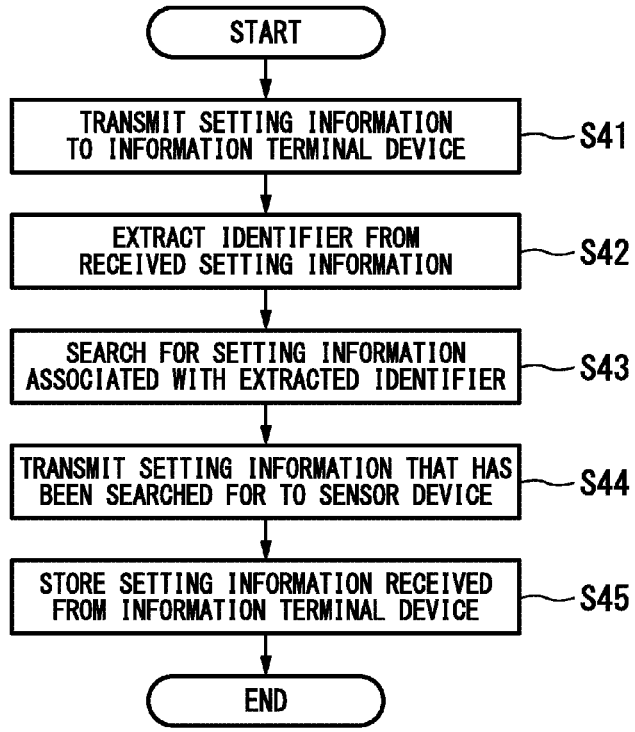
FIG. 7 is a flowchart showing an operation when different setting information is set in each sensor device in the first embodiment of the present invention.

FIG. 7 is a flowchart showing an operation when different setting information is set in each sensor device in the first embodiment of the present invention. The flowchart shown in FIG. 7 is also initiated by the operator causing the information terminal apparatus TM to touch the sensor device 11. The storage 33 of the information terminal apparatus TM used in this operation stores a table in which ID information of the sensor device 11 (ID information uniquely determined for each sensor device 11) and setting information to be set in the sensor device 11 are associated with each other.

When the operator causes such an information terminal apparatus TM to touch the sensor device 11, supply of power is initiated from the NFC reader-writer 32 of the information terminal apparatus TM to the NFC tag 23 of the sensor device 11, and a data read request is transmitted. When this read request is received by the NFC tag 23 of the sensor device 11, the setting information stored in the memory 23*a* is read and transmitted to the information terminal apparatus TM (step S41).

When the setting information transmitted from the NFC tag 23 of the sensor device 11 is received by the NFC reader-writer 32 of the information terminal apparatus TM, a process of extracting the ID information (ID information of the sensor device 11) included in the setting information (step S42) and searching for the table stored in the storage 33 using the extracted ID information as a key is performed by the controller 34 (step S43). When the setting information associated with the ID information used as the key is obtained, a data write request and data to be written (setting information obtained through the search) are transmitted from the NFC reader-writer 32 of the information terminal apparatus TM to the NFC tag 23 of the sensor device 11 (step S44). When this write request is received by the NFC tag 23 of the sensor device 11, the data to be written (the setting information obtained through the search) is stored in the memory 23*a* of the NFC tag 23 (step S45), and the processes in the flowchart are finished.

Thus, when the different setting information is set in each sensor device 11, work in which the operator causes the information terminal apparatus TM to touch the sensor device 11 once is performed. Such work is performed, for example, when the setting information set in each sensor device 11 is desired to be changed or when the setting information is desired to be set in only a specific sensor device 11. For example, "EUI64" that is 64-bit identification information previously assigned to each sensor device 11 in order to uniquely identify the sensor device 11 may be used as the above-described ID information.

((Fifth Operation))

Figure 8:
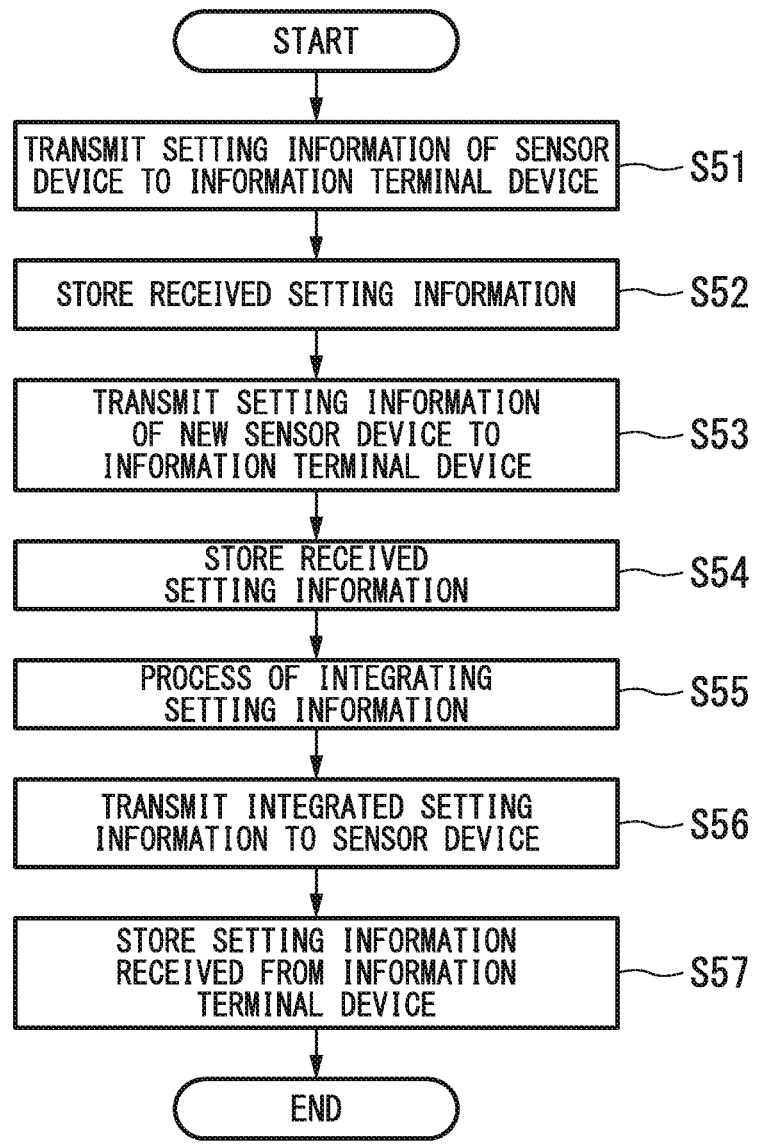
FIG. 8 is a flowchart showing an operation when a sensor device is replaced in the first embodiment of the present invention.

FIG. 8 is a flowchart showing an operation when the sensor device is replaced in the first embodiment of the present invention. The flowchart of FIG. 8 is also initiated by the operator causing the information terminal apparatus TM to the touch the sensor device 11. When the operator causes the information terminal apparatus TM to touch the sensor device 11, supply of power is initiated from the NFC reader-writer 32 of the information terminal apparatus TM to the NFC tag 23 of the sensor device 11, and a data read request is transmitted.

When this read request is received by the NFC tag 23 of the sensor device 11, the setting information stored in the memory 23a is read and transmitted to the information terminal apparatus TM (step S51). When the setting information transmitted from the NFC tag 23 of the sensor device 11 is received by the NFC reader-writer 32 of the information terminal apparatus TM, the setting information is stored in the storage 33 (step S52). After the reading of the setting information is performed, the information terminal apparatus TM may perform an invalidation process (a process of disabling the sensor device 11 to participate in the wireless network N1) on the sensor device 11.

Then, when the operator causes the information terminal apparatus TM to touch a new sensor device (a new sensor device with which the sensor device 11 is replaced), supply of power to the new sensor device is performed, and a data read request is transmitted. Accordingly, setting information of the new sensor device is transmitted to the information terminal apparatus TM (step S53), and stored in the storage 33 of the information terminal apparatus TM (step S54). When this process ends, a process of integrating the setting information obtained from the sensor device 11 and the setting information obtained from the new sensor device and adding new setting information (for example, security key) is performed by the controller 34 of the information terminal apparatus TM, as necessary (step S55).

When the operator causes the information terminal apparatus TM to touch the new sensor device after the above process ends, supply of power is initiated from the NFC reader-writer 32 of the information terminal apparatus TM to the NFC tag 23 of the new sensor device. Also, a data write request and data to be written (setting information processed by the controller 34) are transmitted from the NFC reader-writer 32 of the information terminal apparatus TM to the NFC tag 23 of the new sensor device (step S56). When the write request is received by the NFC tag 23 of the new sensor device, the data to be written (setting information processed by the controller 34) is stored in the memory 23a of the NFC tag 23 (step S57), and the processes in the flowchart are finished.

Thus, when the sensor device 11 is replaced with the new sensor device, the operator first causes the information terminal apparatus TM to touch the sensor device 11 such that the setting information of the sensor device 11 is read to the information terminal apparatus TM. Then, the operator causes the information terminal apparatus TM to touch the new sensor device such that the setting information of the new sensor device is read to the information terminal apparatus TM. Finally, the operator causes the information terminal apparatus TM to touch the new sensor device such that setting information processed by the information terminal apparatus TM is written to the new sensor device. By performing this work, the setting information of the sensor device 11 is handed over to the new sensor device. While the information terminal apparatus TM is caused to touch the new sensor device two times in the above-described example, reading and writing of the setting information may be performed by one touch. When a broken sensor device 11 is replaced with the new sensor device, the integration process in step S55 is omitted, and information of the broken sensor device 11 may be written to the new sensor device.

<Operation of Gateway>

The gateway apparatus 16 always performs, for example, an operation of decrypting data received from the sensor device 11 using the encryption key K1, storing the decrypted data in the storage 45, encrypting the decrypted data again, and then transferring the encrypted data to the monitoring and control apparatus 17. Further, the gateway apparatus 16 always performs an operation of decrypting data received from the monitoring and control apparatus 17, encrypting the decrypted data using the encryption key K2 again, and then transferring the encrypted data to the actuator device 12.

When the operator causes the information terminal apparatus TM to touch the gateway apparatus 16, the data stored in the storage 45 of the gateway apparatus 16 can be read. Further, when the operator causes the information terminal apparatus TM to touch the gateway apparatus 16, the gateway apparatus 16 can be caused to perform the same operation as any of the first to fifth operations described above. For example, when the first operation described above is performed and the setting information of the memory 44a provided in the NFC tag 44 of the gateway apparatus 16 is updated, the sensor device 11, the actuator device 12, and the like are notified of the updated setting information, as necessary.

As described above, in this embodiment, the sensor device 11 or the like includes the NFC tag 23 that performs the NFC, so that transmission and reception of the setting information stored in the memory 23a are performed by the NFC. Further, in this embodiment, the gateway apparatus 16 includes the NFC tag 44 that performs the NFC, so that transmission and reception of the setting information stored in the memory 44a and the data obtained from the sensor device 11 are performed by the NFC. Therefore, it is possible to improve workability and work efficiency of various operations performed at a site.

Further, in this embodiment, the memories 23a and 44a that store the setting information are provided in the NFC tags 23 and 44 operated by the supply of power from the outside. Therefore, even if a failure occurs in the sensor device 11 or the gateway apparatus 16, reading of the setting information stored in the storage memories 23a and 44a can be performed as long as the NFC tags 23 and 44 are operable. In addition, in this embodiment, it is possible to easily control the transition to the sleep state of the sensor device 11 and the release of the sleep state. Further, since the NFC tag 23 can perform NFC even when the controller 25 of the sensor device 11 or the like is in the sleep state, power saving of the sensor device 11 can be achieved. Accordingly, when a battery is used as a power supply in the power supply 26, it is possible to reduce consumption of the battery.

[Second Embodiment]
<Wireless Communication System>

An entire configuration of a wireless communication system of this embodiment is the same as that of the wireless communication system according to the first embodiment shown in FIG. 1. Therefore, detailed description of the wireless communication system is omitted.

<Wireless Device>

Figure 9:
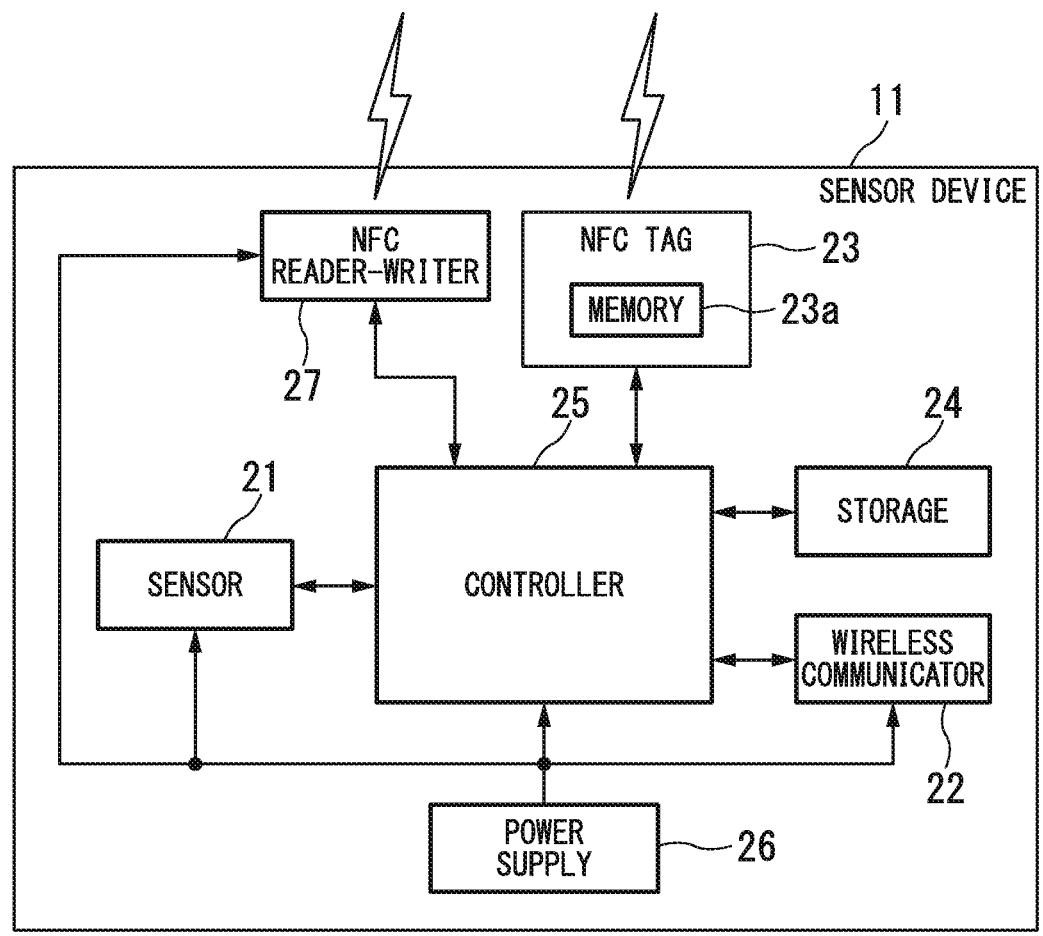
FIG. 9 is a block diagram showing a main configuration of a sensor device as a wireless device according to a second embodiment of the present invention.

FIG. 9 is a block diagram showing a main configuration of the sensor device as a wireless device according to a second embodiment of the present invention. As shown in FIG. 9, the sensor device 11 of this embodiment has a configuration in which an NFC reader-writer 27 (reader-writer) is added to the sensor device 11 according to the first embodiment shown in FIG. 2. The NFC reader-writer 27 includes an antenna (not shown), similar to the NFC reader-writer 32 of the information terminal apparatus TM shown in FIG. 2, and is operated by power supplied from the power supply 26. Specifically, the NFC reader-writer 27 performs supply of power to an external device in a non-contact manner, performs NFC with the external device, and performs reading of data from the external device or writing of data to the external device under the control of the controller 25.

<Gateway Apparatus>

Figure 10:
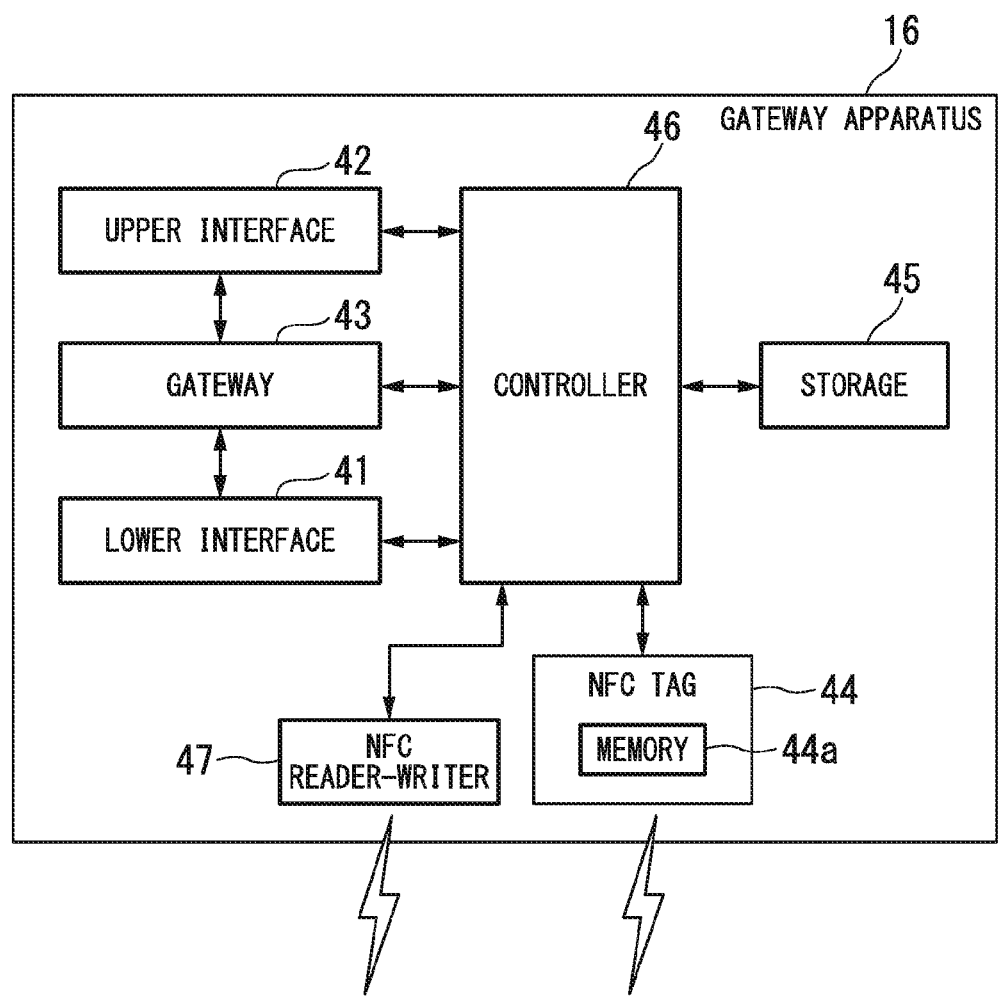
FIG. 10 is a block diagram showing a main configuration of a gateway apparatus according to the second embodiment of the present invention.

FIG. 10 is a block diagram showing a main configuration of a gateway apparatus according to a second embodiment of the present invention. As shown in FIG. 10, a gateway apparatus 16 of this embodiment has a configuration in which an NFC reader-writer 47 (reader-writer) is added to the gateway apparatus 16 according to the first embodiment shown in FIG. 3. The NFC reader-writer 47 is the same as the NFC reader-writer 27 shown in FIG. 9. Specifically, the NFC reader-writer 47 performs supply of power to an external device in a non-contact manner and performs NFC with the external device to read data from the external device or write data to the external device under the control of the controller 46.

<Operation of Sensor Device>

Next, an operation of the sensor device 11 as a wireless device of this embodiment will be described. Since the sensor device 11 of this embodiment includes the NFC reader-writer 27, in addition to the NFC tag 23, the setting information of the sensor device 11 can be handed over to the new sensor device by simply causing the sensor device 11 to touch a new sensor device when replacement of the sensor device 11 is performed. When the sensor device 11 is caused to touch the new sensor device, the same process as the process described with reference to FIG. 8 is performed between the sensor device 11 and the new sensor device.

Further, since the NFC reader-writer 27 is included, in addition to the NFC tag 23 in this embodiment, the following application can be performed.

((Operation Control of Sensor Device))

A table in which uniquely determined ID information and a command (control content) defining the operation of the sensor device 11 are associated with each other is stored in the storage 24 of the sensor device 11 in advance, so that the controller 25 of the sensor device 11 performs control according to the command associated with the ID information loaded by the NFC reader-writer 27. Accordingly, the operator can control the operation of the sensor device 11 by simply causing an NFC card in which the ID information is stored, to touch the sensor device 11.

For example, when a certain NFC card is caused to touch the sensor device 11, the sensor device 11 can be restarted, and when another NFC card is caused to touch the sensor device 11, the sensor device 11 can be operated in a specific communication mode. Further, when a certain NFC card is caused to touch the sensor device 11, the sensor device 11 can transition to the sleep state, and when another NFC card is caused to touch the sensor device 11, the sleep state of the sensor device 11 can be released.

Further, by loading a plurality of NFC cards, a more advanced process can be performed. For example, by causing a NFC card in which the above-described ID information (ID information for controlling the operation of the sensor device 11) is stored and a NFC card in which ID information for identifying an operator is stored, to touch the sensor device 11 simultaneously (or continuously), information on an operator and an operation performed by the operator can be stored in the sensor device 11.

((Recording of Cyclic Inspection Work))

When the ID information for identifying the operator is loaded by the NFC reader-writer 27, the controller 25 of the sensor device 11 stores the ID information and date and time information indicating a date and time at which the loading of the ID information has been performed, in the storage 24. Accordingly, the operator cyclically inspecting a site of a plant can store information on an operator who has performed work and a time at which the work has been performed in the sensor device 11 by simply causing an NFC card in which the ID information is stored to touch the sensor device 11.

Recording of the cyclic inspection work can also be performed in the first embodiment. That is, the information terminal apparatus TM in which the ID information is stored is caused to touch the sensor device 11 shown in FIGS. 1 and 2, and the ID information and the date and time information are written to the memory 23a of the sensor device 11. Accordingly, the information on an operator who has performed work and a time at which the work has been performed are recorded in the sensor device 11.

((Downloading of Firmware))

Firmware used in the sensor device 11 is stored, for example, in the storage 33 of the information terminal apparatus TM shown in FIGS. 1 and 2, and the controller 25 of the sensor device 11 stores the firmware in the storage 24 when the firmware is loaded by the NFC reader-writer 27. Accordingly, the operator can cause the firmware to be downloaded to the sensor device 11 by simply causing the information terminal apparatus TM in which the firmware is stored, to touch the sensor device 11.

<Operation of Gateway>

The gateway apparatus 16 of this embodiment includes the NFC reader-writer 47, in addition to the NFC tag 44. Therefore, when replacement of the gateway apparatus 16 is performed, the setting information of the gateway apparatus 16 can be handed over to the new gateway by simply causing the gateway apparatus 16 to touch a new gateway, as in the case in which the replacement of the sensor device 11 is performed. The same process as the process described with reference to FIG. 8 is performed between the gateway apparatus 16 and the new gateway when the gateway apparatus 16 is caused to touch the new gateway.

Further, the gateway apparatus 16 of this embodiment can be applied similarly to the sensor device 11 of this embodiment described above. For example, an operator can control the operation of the gateway apparatus 16 by causing an NFC card to touch the gateway apparatus 16. Further, the operator can record information on an operator who has performed work and a time at which the work has been performed, in the gateway apparatus 16 by causing the NFC card to touch the gateway apparatus 16.

Further, when a function of the system manager 15 is provided to the gateway apparatus 16 of this embodiment, setting of provisioning information can be performed on the sensor device 11. Specifically, the setting of the provisioning information is performed by causing the gateway apparatus 16 to touch the sensor device 11. When the gateway apparatus 16 is caused to touch the sensor device 11, the setting information of the sensor device 11 is read to the gateway apparatus 16, provisioning information is generated, and the generated provisioning information is written to the sensor device 11. Thus, the setting of the provisioning information for the sensor device 11 is completed.

As described above, in this embodiment, for example, the sensor device 11 or the gateway apparatus 16 includes the NFC tag 23 or 44 that performs the NFC, and transmission and reception of the setting information stored in the memory 23a or 44a are performed by the NFC. Therefore, it is possible to improve workability and work efficiency of various operations performed at a site. Further, in this embodiment, it is possible to perform reading of the setting information stored in the memory 23a or 44a as long as the NFC tag 23 or 44 is operable, and to easily control the transition to the sleep state of the sensor device 11 and release of the sleep state.

Further, in this embodiment, the sensor device 11 includes the NFC reader-writer 27, in addition to the NFC tag 23, and the gateway apparatus 16 includes the NFC reader-writer 47, in addition to the NFC tag 44. Therefore, various applications can be performed, as compared to the sensor device 11 and the gateway apparatus 16 of the first embodiment including only the NFC tag 23 and 44.

[Third Embodiment]
<Wireless Communication System>

Figure 11:
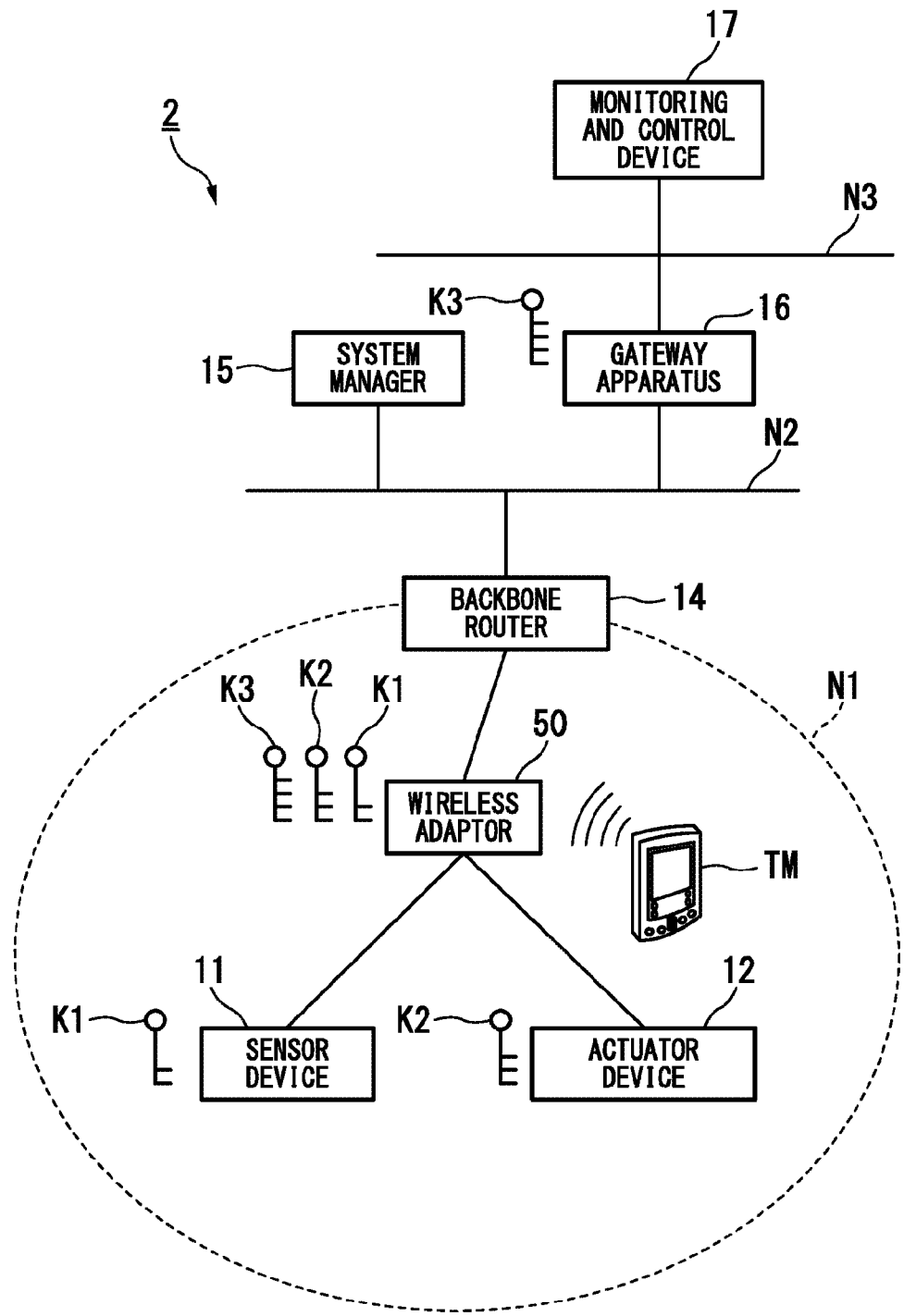
FIG. 11 is a block diagram showing an entire configuration of a wireless communication system according to a third embodiment of the present invention.

FIG. 11 is a block diagram showing an entire configuration of a wireless communication system according to a third embodiment of the present invention. As shown in FIG. 11, a wireless communication system 2 of this embodiment has a configuration in which the wireless router 13 included in the wireless communication system 1 shown in FIG. 1 is replaced with a wireless adapter 50 (wireless device).

The wireless adapter 50 is capable of wireless communication conforming to the wireless communication standard ISA100.11a described above. The wireless adapter 50 is communicatively connected to a wireless network N1 and performs relay of data (encrypted data) over the wireless network N1. Specifically, the wireless adapter 50 transfers data transmitted to its own device over the wireless network N1, to a preset transfer destination over the wireless network N1. For example, the wireless adapter 50 transfers the data transmitted from the sensor device 11 to the own device, to a gateway apparatus 16 over the wireless network N1.

When the wireless adapter 50 performs the above-described transfer process, the wireless adapter 50 decrypts the data transmitted to the own device, encrypts the decrypted data again, and transfers the encrypted data to a preset transfer destination as new data. Such decryption and encryption are performed to enable the encrypted data communicated over the wireless network N1 to be referenced at a site of a plant while ensuring security. Further, the data decrypted by the wireless adapter 50 is accumulated in the wireless adapter 50.

As shown in FIG. 11, different encryption keys are distributed to the wireless adapter 50 in order to ensure the security. Specifically, an encryption key K3 is distributed, in addition to the encryption keys K1 and K2 described above. The encryption key K3 is an encryption key used to perform encrypted communication between the wireless adapter 50 and the gateway apparatus 16. The encryption keys K1, K2, and K3 are distributed by a system manager 15 when the wireless adapter 50 participates in the wireless network N1. Further, the wireless adapter 50 is capable of for example, NFC with the information terminal apparatus TM.

<Wireless Device>

Figure 12:
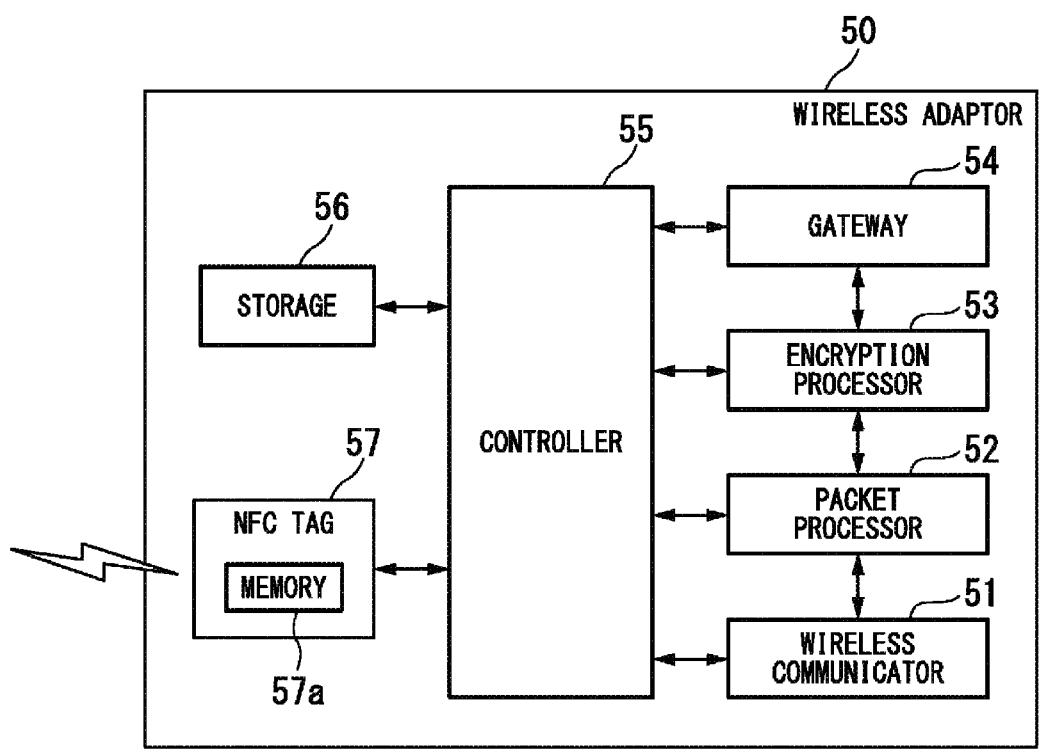
FIG. 12 is a block diagram showing a main configuration of a wireless adapter as a wireless device according to the third embodiment of the present invention.

FIG. 12 is a block diagram showing a main configuration of a wireless adapter as a wireless device according to the third embodiment of the present invention. As shown in FIG. 12, the wireless adapter 50 includes a wireless communicator 51, a packet processor 52, an encryption processor 53, a gateway 54 (transfer controller), a controller 55, a storage 56 (second storage), and an NFC tag 57. The wireless adapter 50 performs relay of encrypted data over the wireless network N1.

The wireless communicator 51 performs transmission and reception of radio signals under the control of the controller 55. The packet processor 52 performs a relay process on packets transmitted and received by the wireless communicator 51 under the control of the controller 55. Specifically, the packet processor 52 inputs a packet to the encryption processor 53 when the packet received by the wireless communicator 51 is addressed to the own device (addressed to the gateway 54 of the wireless adapter 50), and inputs the packet to the wireless communicator 51 when the packet is not addressed to the own device. Further, the packet processor 52 inputs data output from the encryption processor 53 (data to be transmitted over the wireless network N1) to the wireless communicator 51.

The encryption processor 53 performs an encryption process using the encryption keys K1 to K3 shown in FIG. 1 under the control of the controller 55. Specifically, the encryption processor 53 decrypts the data output from the packet processor 52 and inputs the decrypted data to the gateway 54, and encrypts data output from the gateway 54 and inputs the encrypted data to the packet processor 52.

The gateway 54 performs a process of transferring data, which is transmitted to the own device. For example, the gateway 54 transfers, to the gateway apparatus 16, the data transmitted from the sensor device 11 to the own device. The controller 55 controls an entire operation of the wireless adapter 50. For example, the controller 55 performs control of reading the data stored in the storage 56 and inputting the data to the information terminal apparatus TM based on a request from the information terminal apparatus TM.

The storage 56 is, for example, a nonvolatile semiconductor memory, and stores the data decrypted by the encryption processor 53 (for example, the data transmitted from the sensor device 11). The NFC tag 57 is the same as the NFC tag 23 shown in FIG. 2, includes an antenna (not shown) and a memory 57a, is operated by power supplied from the outside (for example, the information terminal apparatus TM), and performs NFC with the outside.

<Operation of Wireless Adapter>

When the data is assumed to be transmitted from the sensor device 11 to the wireless adapter 50, this data is received by the wireless communicator 51 of the wireless adapter 50. The data received by the wireless communicator 51 is input to the packet processor 52. The data transmitted from the sensor device 11 is data addressed to the wireless adapter 50 (addressed to the gateway 54 of the wireless adapter 50). Therefore, the data input to the packet processor 52 is input to the encryption processor 53. Then, in the encryption processor 53, a process of decrypting the data transmitted from the sensor device 11 using the encryption key K1 is performed (see FIG. 11). The decrypted data is output from the encryption processor 53 to the controller 55 and stored in the storage 56.

When a predetermined transfer condition (for example, reaching a transfer timing) is satisfied, the data stored in the storage 56 is read and input to the gateway 54, and a process of transferring the data to the gateway apparatus 16 is performed. When this transfer process is performed, the data to be transferred to the gateway apparatus 16 is sequentially output from the gateway 54 to the encryption processor 53 and encrypted using the encryption key K3. The encrypted data is output from the encryption processor 53 to the wireless communicator 51 via the packet processor 52 and transmitted as a radio signal to the wireless network N1.

The data transmitted as a radio signal from the wireless adapter 50 is received by the backbone router 14, received by the gateway apparatus 16 over the backbone network N2, and decrypted using the encryption key K3 distributed to the gateway apparatus 16. The decrypted data is collected by the monitoring and control apparatus 17 from the gateway apparatus 16 over the control network N3.

When the operator causes the information terminal apparatus TM to touch the wireless adapter 50 in the vicinity of an installation place of the wireless adapter 50, supply of power from the NFC reader-writer 32 of the information terminal apparatus TM (see FIGS. 2 and 3) to the NFC tag 57 of the wireless adapter 50 is initiated. Also, a data read request is transmitted from the NFC reader-writer 32 of the information terminal apparatus TM to the NFC tag 57 of the wireless adapter 50. When this read request is received by the NFC tag 57 of the wireless adapter 50, the setting information stored in the memory 57a or the data stored in the storage 56 is read and transmitted to the information terminal apparatus TM. Thus, it is possible to acquire the setting information stored in the wireless adapter 50 or the data transmitted from the sensor device 11 to the wireless adapter 50.

As described above, in this embodiment, the wireless adapter 50 includes the NFC tag 57 that performs the NFC, and transmission and reception of the setting information stored in the memory 57a or the data stored in the storage 56 is performed by the NFC. Therefore, it is possible to acquire the data obtained from the sensor device 11 without visiting the installation place of the sensor device 11. Accordingly, it is possible to improve workability and work efficiency of various work performed at a site. Further, in this embodiment, it is possible to perform reading of the setting information stored in the memory 57a as long as the NFC tag 57 is operable, and to easily control the transition to the sleep state of the wireless adapter 50 and release of the sleep state.

While the wireless device, the gateway apparatus, and the wireless communication system according to the embodiments of the present invention have been described above, the present invention is not limited to the above-described embodiments, but may be freely modified within the scope of the present invention. For example, the example in which the setting information of the sensor device II is acquired by the NFC has been mainly described in the above-described embodiment. However, data indicating the measurement result of the sensor device 11, data indicating the operation amount of the actuator device 12, or incidental status information may be acquired by the NFC.

Further, in the above-described embodiment, a communication protocol used in wireless communication over the wireless network N1 has been a communication protocol conforming to the wireless communication standard ISA100.11a. However, for example, the communication protocol used in the wireless communication over the wireless network N1 may be a communication protocol conforming to WirelessHART (registered trademark) or ZigBee (registered trademark).

Further, the example in which the backbone router 14, the system manager 15, and the gateway apparatus 16 are realized as respective separate apparatuses has been described in the above-described embodiment. However, any two or more of such apparatuses can be realized as one apparatus. For example, the system manager 15 and the gateway apparatus 16 may be realized as one apparatus, or all of the backbone router 14, the system manager 15, and the gateway apparatus 16 may be realized as one apparatus.

What is claimed is:

1. A wireless device that performs an operation based on setting information, comprising:
    a wireless communicator configured to perform wireless communication over a wireless network;
    a near field communicator comprising a memory storing the setting information and configured to perform transmission and reception of the setting information stored in the memory by near field communication;
    a controller configured to control at least the wireless communicator; and
    a power supply,
    wherein
    the wireless communicator and the controller are configured to operate using power supplied from the power supply, and
    the near field communicator and the memory are configured to operate using power supplied from an outside of the wireless device by the near field communication.

2. The wireless device according to claim 1, wherein the near field communicator is configured to cause the controller to transition to a sleep state or release the sleep state of the controller based on information received by the near field communication.

3. The wireless device according to claim 1, further comprising:
    a reader-writer configured to perform at least one of reading of information from the outside of the wireless device and writing of information to the outside by the near field communication.

4. The wireless device according to claim 3, wherein the reader-writer is configured to supply power to the outside by the near field communication.

5. The wireless device according to claim 3, wherein the controller is configured to use a table in which predetermined ID information and a control content are associated with each other and to perform a control associated with the ID information included in the information read by the reader-writer.

6. The wireless device according to claim 3, further comprising:
    a first storage storing ID information included in the information read by the reader-writer and date and time information indicating a date and time at which the reading of the ID information has been performed.

7. The wireless device according to claim 2, wherein the near field communicator is configured to input a sleep release signal to the controller after supplying a part of power supplied from the outside of the wireless device by the near field communication.

8. The wireless device according to claim 3, wherein the power supply is configured to supply power to the near field communicator and the reader-writer.

9. The wireless device according to claim 3, wherein the reader-writer is configured to write the setting information stored in the memory to another wireless device.

10. The wireless device according to claim 1, further comprising:
an actuator configured to perform measurement of a state amount or an operation,
wherein the controller is configured to perform setting of the actuator based on the setting information stored in the memory.

11. The wireless device according to claim 1, further comprising:
a transfer controller configured to transfer data addressed to the wireless device and transmitted over the wireless network to a preset transfer destination.

12. The wireless device according to claim 1, further comprising:
a second storage storing data addressed to the wireless device,
wherein the near field communicator is configured to perform transmission of the data stored in the second storage.

13. A wireless communication system capable of performing wireless communication over a wireless network, comprising:
a wireless device according to claim 1 communicatively connected to the wireless network.

14. The wireless communication system according to claim 13, further comprising:
a wireless router configured to communicatively connect the wireless network to a first network;
a monitoring and control apparatus communicatively connected to a second network and configured to monitor and control the wireless device; and
a gateway apparatus configured to communicatively connect the first network to the second network, comprising:
a first communicator connected to the first network;
a second communicator connected to the second network; and
a near field communicator comprising a memory storing the setting information to be set in the wireless device and configured to perform transmission and reception of the setting information stored in the memory by the near field communication.

15. The wireless device according to claim 1, further comprising a first storage storing a measurement result of a sensor,
wherein the wireless communicator is further configured to transmit the measurement result of the sensor stored in the first storage to an outside of the wireless device by wireless communication over a wireless network.

16. The wireless device according to claim 15, wherein the memory is separate from the first storage.

17. A gateway apparatus, comprising:
a first communicator connected to a first network;
a second communicator connected to a second network; and
a near field communicator comprising a memory storing setting information to be set in a wireless device and configured to perform transmission and reception of the setting information stored in the memory by near field communication,
wherein
the first and second communicator are configured to operate using power supplied from a power supply, and
the near field communicator and the memory are configured to operate using power supplied from an outside of the gateway apparatus by the near field communication.

18. The gateway apparatus according to claim 17, further comprising:
a reader-writer configured to perform at least one of reading of information from the outside of the gateway apparatus and writing of information to the outside by the near field communication.

19. The gateway apparatus according to claim 17, further comprising a first storage storing a measurement result of a sensor,
wherein the first communicator and the second communicator are configured to perform transmission and reception of the measurement result of the sensor stored in the first storage.

* * * * *